United States Patent [19]

Hughes et al.

[11] Patent Number: 4,943,700
[45] Date of Patent: Jul. 24, 1990

[54] LASER SAWMILL

[75] Inventors: John L. Hughes, Melbourne; Paul Lastavec, Narooma, both of Australia

[73] Assignee: Austral Asian Lasers Pty. Ltd., Melbourne, Australia; a part interest

[21] Appl. No.: 265,228

[22] Filed: Oct. 31, 1988

[51] Int. Cl.$^5$ .......................................... B23K 26/00
[52] U.S. Cl. ........................ 219/121.67; 219/121.75; 219/121.82; 219/121.86
[58] Field of Search ....................... 219/121.75, 121.73, 219/121.67, 121.72, 121.78, 121.82, 121.6, 121.85, 121.86, 121.84

[56] References Cited

U.S. PATENT DOCUMENTS

| | | | |
|---|---|---|---|
| 4,177,372 | 12/1979 | Kotera et al. | 219/121.86 X |
| 4,574,180 | 3/1986 | Kasner et al. | 219/121.82 |
| 4,689,467 | 8/1987 | Inoue | 219/121.84 X |
| 4,710,604 | 12/1987 | Shirasu | 219/121.82 X |
| 4,734,550 | 3/1988 | Imamura et al. | 219/121.82 X |

Primary Examiner—C. L. Albritton
Attorney, Agent, or Firm—Edwin D. Schindler

[57] ABSTRACT

This invention relates to a high peak power laser sawmill where the material to be cut and sealed is positioned relative to one or more focussed laser beam propagation paths such that said focussed laser beams self-focus into said material forming a hairline cut.

The invention has applications in cutting wood, rocks, ceramics, metals and organic materials and in sealing the cut surfaces during the cutting process.

8 Claims, 3 Drawing Sheets

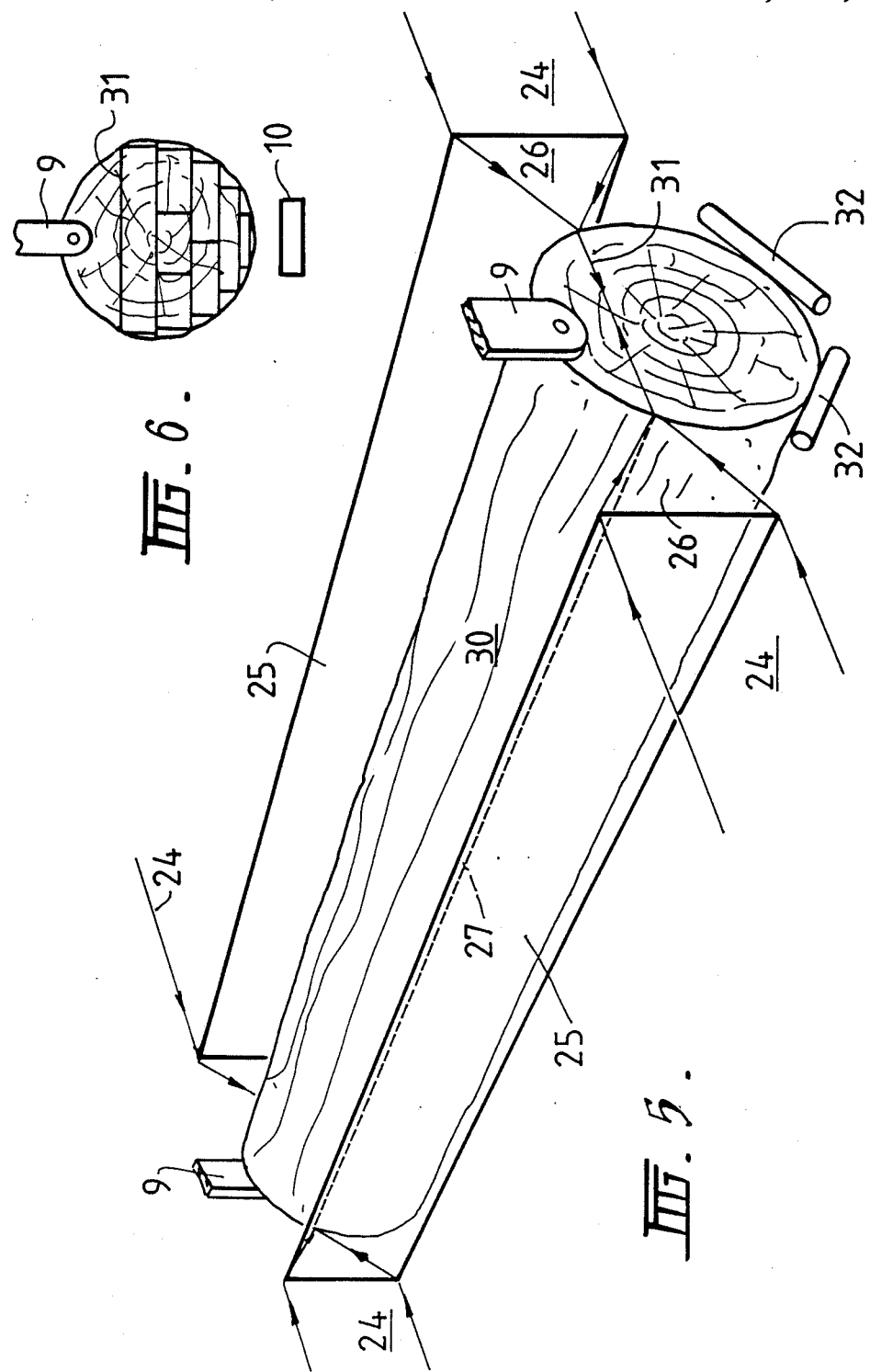

LASER SAWMILL

FIELD OF THE INVENTION

This invention relates to a laser "sawmill" system for cutting, milling and surface sealing material objects such as woods, rocks, plastics, ceramics metals and chemicals, consisting of a powerful laser beam generator, beam guiding optics, laser beam focusing optics, material handling equipment, electro-optical alignment equipment, to align said material relative to said laser beams, waste suction and disposing systems, computer control module and a safety enclosure which can be partially evacuated.

The invention has application in the timber industry for cutting large logs and moisture sealing the cut surfaces in the same process, for the cutting of rocks, ceramics, chemicals and metals which can be passing the said laser beams at high speeds of many meters per second, for example in a steel mill.

SUMMARY OF THE PRIOR ART

Prior art laser cutting systems have utilized low power, continuous wave, laser beams, for example, carbon dioxide laser beams, to slowly cut materials at the rate of up to several meters per second. The depth of cut of these prior art laser cutters has been very poor being in the millimeter rather than in the centimeter range. The only exception to this rule with prior art laser cutters has been the thermal focussing of carbon dioxide laser beams in perspex rods where a channel of considerable depth can be ploughed within the material for up to a meter length before significant melting of the material takes place. However, in general, prior art laser beam cutters can only cut along the depth of focus of the focussed laser beam. This means that the deeper the cut, the wider it becomes and the greater become the chances of the material being melted in such a manner as to destroy the cut. The thermal cutting mechanisms of prior art laser cutters, therefore, place severe restrictions on their material cutting abilities and such prior art systems cannot be used for the deep cuts necessary for the applications of lasers in the timber industry and their thermal cutting characteristics eliminate them as contenders for ceramic and rock cutting where the low thermal conductivity of the materials lead to severe local heating and the uncontrollable cracking of the material.

Our invention overcomes the defect of the prior art laser material cutters by using laser beams of sufficient peak power to fully utilize the non-linear optical mechanism of laser beam self-focussing where the coarsely focussed primary laser beam is self-focussed in a dense plasma formed on the surface of the material to be cut by a "pre-pulse" emitted by the said laser a few nano seconds $10^{-9}$ seconds) ahead of the main pulse. This pre-pulse plasma lens causes the main pulse focussed beam to automatically focus from between 50 and 100 microns (between $5 \times 10^{-3}$ and $10^{-2}$ centimeters) to the dimension of the laser wavelength which, for example, could lie anywhere in the range 0.2 to 10 microns depending on the laser being used. However, in general, the shorter the laser operating wavelength, the better will be the coupling into the dense pre-pulse plasma and hence the better will be the self-focussing process as far as the transfer of the incident laser beam energy into the bulk of the material to be cut is concerned.

Although the present invention only cuts a "hairline" cut in the material, of the order of $10^{-4}$ cms wide, pressures will be exerted sideways within the channel which will push the material sections apart. At the same time, the surfaces of the cut sections will be self-sealed and "fire-polished" so that the moisture within the bulk of the material will be trapped.

In our invention, thermal cutting, where sufficient time exists for the dissipation of heat generated in the cutting process as characterised by prior art laser cutters, is eliminated by utilising laser pulses of such short duration, less than 100 picoseconds ($10^{-10}$ seconds) that the non-linear cutting and ablation processes are over before thermal effects can contribute to the cutting process.

Our cutting techniques are independent of the material to be cut because laser beams can vapourise all known materials. Furthermore, laser beams of sufficient power can maintain self focussed channels for up to one meter in all known materials so that two such beams aligned in a given plane can cope with the cutting of trees treated in the timber industry.

BACKGROUND OF THE INVENTION

One of us (Paul Lastavec) has wide experience in the timber industry and, becoming concerned with the rapidly increasing costs of conventional sawmills where an expensive saw blade can easily be destroyed, considered lasers as an alternative.

Being totally discouraged by the capabilities of laser cutting systems produced to 1985 he made an approach to the Australian Department of Industry, Technology and Commerce who directed him to the co-inventor, (JLH) who was developing scalable phased-array lasers whose operating characteristics had been classified by the United States Patent Office in 1984 and remain classified at this time.

It was considered to be a simpler task to destroy a log at a distance of a few meters than an intercontinental missile at a distance of a few thousand kilometers. Furthermore, much more precise laser beam manipulation was possible over distances of several meters in particular the use of the pre pulse self-focussing plasma lens to generate "hair-line" cuts in any material.

An additional advantage of the laser "hair-line" cut is the fact that the cut surfaces are automatically sealed during the cutting process so that body moisture is trapped within the cut sections of the logs eliminating the need for expensive drying processes.

Although the width of the laser induced "hair-line" cut is of the order of $10^{-4}$ centimeters, a typical log can be one meter in diameter and up to 30 meters in length. This means that the volume of material that needs to be ablated is about 30 cubic centimeters, no mean task. However, we need only compress this amount of material sideways in total distance of less than $5 \times 10^{-5}$ centimeters over the whole cut surfaces of the log. There is no need to annihilate 30 cubic centimeters of material. All that is needed of a 10 megajoule laser is the planar creation of a "hair-line" cut whose area is up to 300,000 square centimeters. We contemplate a laser output power up to $10^{17}$ watts.

OBJECTS OF THE INVENTION

It is the object of this invention to provide means of coupling a high power laser beam into a log 1.5 meters in diameter and 30 meters long which has been accurately positioned relative to said laser beam, such that the coupling plasma on said log allows for the self-focussing of said focussed laser beam so that a channel is cut into said log in a plane so as to cut it in predetermined sections.

Another object of the invention is to provide means of self-sealing the cut surface of sections of a log such that the moisture content of said log is trapped within the log thus avoiding distortions encountered in conventional log drying processes.

Another object of the invention is to provide a pair of focussed laser beams of high power so that the self-focussed channel cut from either side of a log is along a common plane through said log.

Yet another object of the invention is to eliminate waste products in the log cutting process by melting and fire polishing the cut surfaces of the log.

Another object of the invention is to provide focussed laser beams of circular cross-section which form self-focussed channels of circular cross-section created in a sequence to form a planar cut of the log sections.

It is an object of the invention to provide electro-optic scanning of the log to be cut so that it can first of all be trimmed for the actual cutting process which is automatically adjusted to a particular log size.

It is an object of the invention to provide means of cutting metals, ceramics and organic material either in a line focus generated by a laser output beam of rectangular cross-section or by a sequence of self-focussed channels formed by the self-focussing of a laser beam of circular cross-section.

It is an object of the invention to provide an evacuated safety enclosure for the log to be cut so as to avoid the ionization of the atmosphere by the intense laser beams used and to protect the operators from said powerful laser beams.

SUMMARY OF THE DRAWINGS

A better understanding of the invention will be obtained from the following description when read in conjunction with the accompanying drawings.

FIG. 5 shows a large piece of timber being positioned for cutting. It should be noted that since the logs to be cut can be tapered, the focal length of the focussed laser beam along the log will vary from one end of the log to the other and a timing delay is introduced along the laser output aperture to accommodate this log taper so that the channel through the log is formed at a given time.

FIG. 6 shows the method used to align the log and cut it into selected sections.

DETAILED DESCRIPTION OF THE INVENTION

Figure 1:
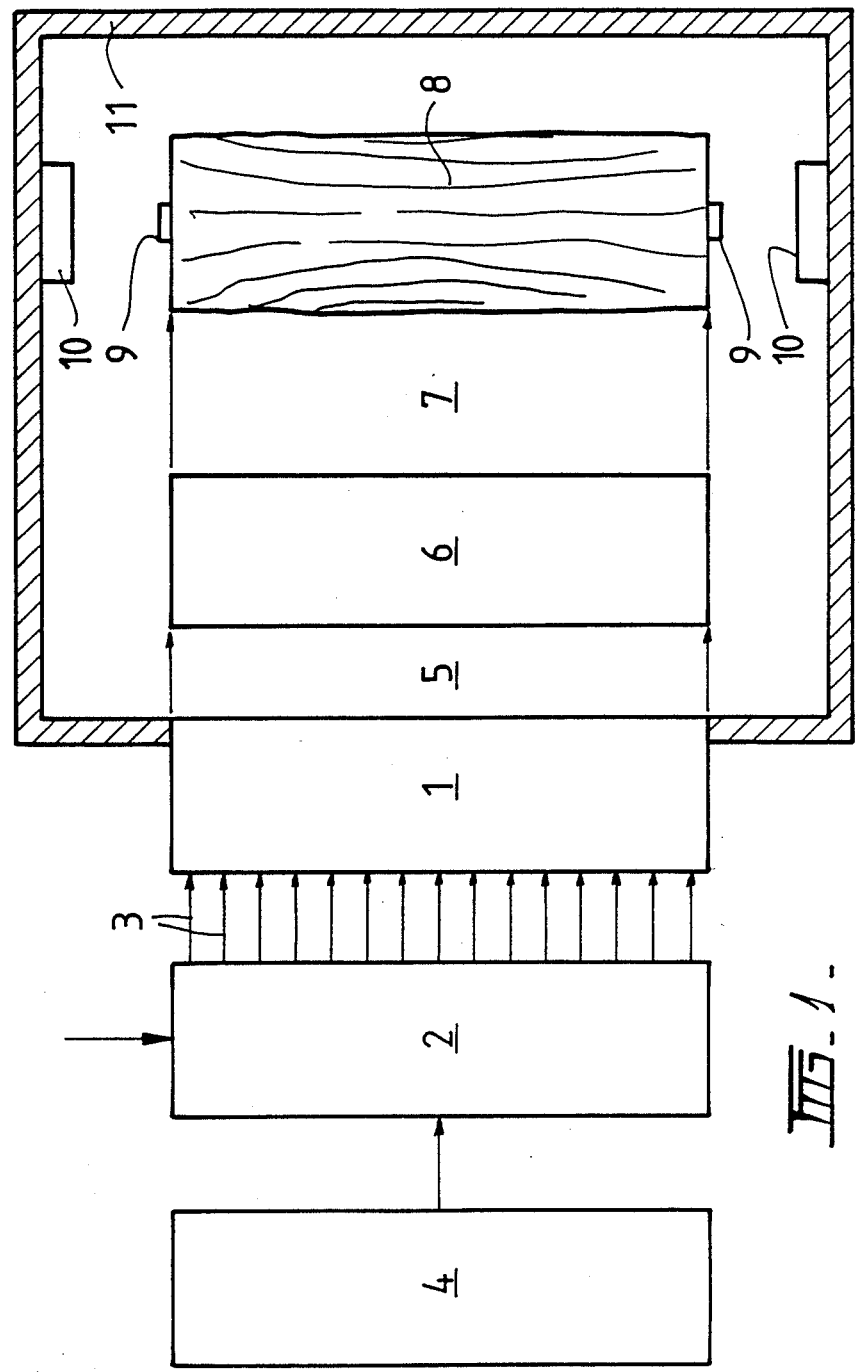
FIG. 1 shows the overall layout of the laser sawmill with a powerful laser beam generator which can take the form of lasers such as phased-array lasers, free election lasers or powerful slab lasers. The output beam of the laser can be of rectangular or circular cross-section, the sequence of circular cross-section overlapping laser beams forming a row of self-focussed channels which in turn form the planar cut of the log sections. The log to be cut is positioned, via an electro-optic alignment system, relative to the path of the laser beams prior to the cutting process taking place. An evacuated safety chamber is used to enclose the log during the cutting process to avoid air ionization by the powerful laser beams used and also to protect personnel in the vicinity.

In FIG. 1, numeral 1 indicates a powerful laser beam generator which can either emit a single laser beam of rectangular cross-section or a sequence of overlapping laser beams of circular cross-section the rectangular beam being capable of being emitted as a low power pre-pulse to generate a line plasma on the object to be cut. Numeral 2 indicates the power supply necessary to drive laser 1 the power being delivered via a series of cables indicated by numeral 3.

Figure 2:
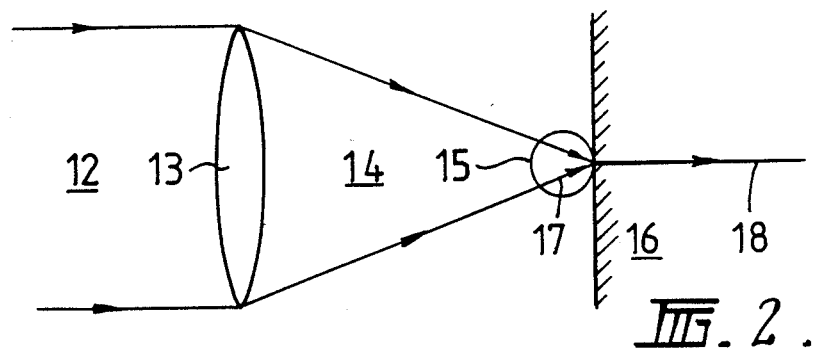
FIG. 2 shows the plasma lens used to self-focus the incident focussed laser beam into the log.

Numeral 4 indicates the computer required to fire the laser 1 and control the operation of the sawmill. Numeral 5 indicates the laser output beam whilst numeral 6 indicates the focussing lens assembly necessary to direct the low powered pre-pulse, high powered beam of rectangular cross-section or a sequence of overlapping laser beams of air and in cross-section in a focussed beam indicated by numeral 7 onto the material to be cut which is indicated by numeral 8. Numeral 9 indicates the clamps used to hold and position material 8 relative to said laser beam 7. Numeral 10 indicates the electro-optic viewing system to position item 8 relative to laser beam 7. Numeral 11 indicates the evacuated safety enclosure which avoids both laser beam ionization of the air and protects personnel in the vicinity. In FIG. 2 numeral 12 indicates the incoming laser beam, numeral 13 the focussing element, numeral 14 the focussed output beam, focussed to 100 microns ($10^{-2}$ cms) diameter spot or $10^{-2}$ cms wide line. Numeral 15 indicates a pre-pulse induced plasma formed on the surface indicated by numeral 16 in which the incident, primary focussed laser beam 14 self-focusses to produce the very narrow channel indicated by numeral 18 within the bulk material.

Figure 3:
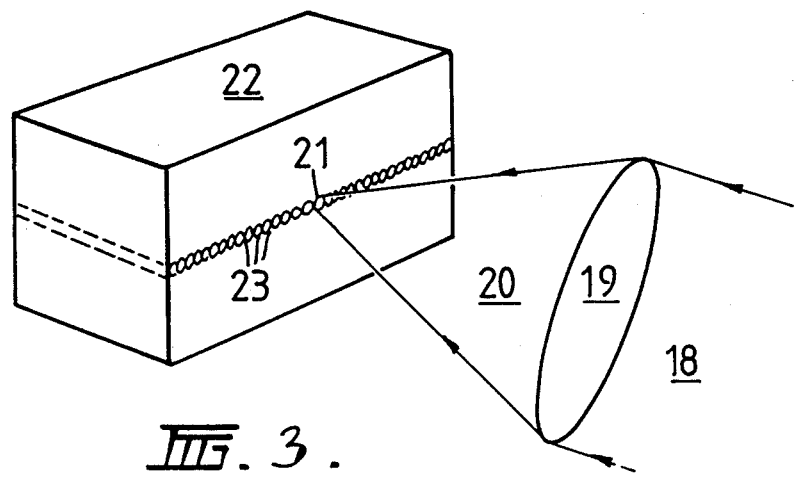
FIG. 3 shows a sequence of self-focussed channels being formed in a sample material to be cut.
Figure 4:
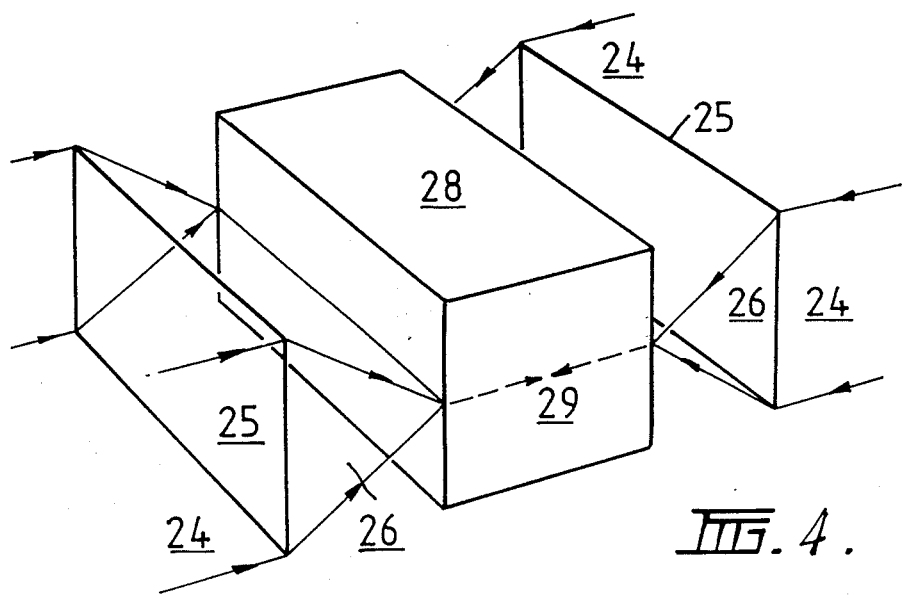
FIG. 4 shows two equal, but oppositely directed, focussed laser beams cutting the self-focussed beam channel in a sample block.

In FIG. 3 numeral 18 indicates a laser beam of circular cross-section focussed by the element indicated by numeral 19 into the focussed beam indicated by numeral 20. The pre-pulse plasma indicated by numeral 21 is the entrance to the bulk of the material indicated by numeral 22 to form the self-focussed channel indicated by numeral 23. The required sequence of channels 23 can be generated by moving beam 18 along a laser output aperture of rectangular cross-section. The position of the circular cross-section laser beam output along the rectangular aperture at any time is determined by the portion of the laser beam generators active medium which is excited under computer control. In FIG. 4, the outputs of two laser beam generators are directed from both sides of the material to be cut such that in the unfocussed, parallel beam mode of propagation the two beams would exactly overlap so that their central axes are in the same plane. Here, numerals 24 indicate the two equal, but oppositely directed laser beams of rectangular cross-section which are focussed via the focussing elements indicated by numerals 25. The focussed beams indicated by numerals 26 self-focus in the pre-pulse plasma indicated by numeral 27 before penetrating into the bulk material indicated by numeral 28 via the self-focussing channel indicated by numeral 29.

In FIG. 5, a tapered log indicated by numeral 30 is cut along channel 31 after being rolled into the safety enclosure on roller arrays indicated by numeral 32 and lifted via arms 9. Since the log 30 is tapered, focussed beam 26 is focussed along different focal lengths from one side of the output aperture to the other. Also a travelling wave output is used to sweep the laser beam energy from the front to the back of log 30. One way of achieving a varying focal length for focussed beams 26 is simply to reduce the output aperture diameter of the laser beams. Thus if we have large diameter laser beams on the front end of log 30 and smaller diameter laser beam on the back end we have a longer focal length at the rear than at the front. The required travelling wave sequence is achieved by sequentially exciting the laser medium in a direction perpendicular to the propagation of the output beams.

In FIG. 6 numeral 31 indicates the optimum cutting sequence controlled via electro-optic monitoring system 10 and the arms 9 with the log having to be moved through 90° to achieve the shorter cuts using only one laser output beam.

To achieve self-focussing channels via a pre-pulse plasma, the incident focussed laser beam intensities must exceed $10^{15}$ watts per square centimeter at a wavelength of one micron ($10^{-4}$ cms). However, the shorter the laser wavelength, the more effective we can anticipate the invention to become. Using lasers with efficiencies in excess of 10%, a power source of less than 200 kilo-voltamperes is required, which via condenser storage can excite a photo-emitting diode excited phased-array fibre laser to a peak power of $10^{17}$ watts with picoseconds pulse duration. This level of output power can operate one pulse per second. With wider pulse durations and higher pulse energies a less rapid firing rate has to apply for whole aperture outputs. However, sequential firing of circular cross-section beams can be achieved during each firing of the laser, so that the total output energy on target is the same as for a whole aperture firing.

The invention, because it utilizes whole beam self-focussing of the output, allows for much deeper cuts than is possible with any prior art laser beam cutter. However, the invention is capable of cutting any material of any thickness up to one meter, including ceramics, rocks, metals and organic compounds.

As it cuts, the invention seals the cut surface, trapping moisture and bypassing the need for drying the timber. In the case of rocks and metals the surfaces can be fire polished. As the capacity and capabilities of lasers increase, the effectiveness of the invention will also increase.

It should be noted that tapered logs can be cut by the invention by appropriately tilting said log lengthways to line up with the line focus of the said focussed laser beam.

Having thus described our invention, however, many modifications thereto will become apparent to those skilled in the art to which it pertains without deviation from the spirit of the invention as described by the scope of the appended claims.

We claim:

1. A laser sawmill system for cutting and surface sealing wood, rock, plastic and ceramic objects comprising a powerful laser beam generator with a rectangularly shaped output aperture which can emit a single laser beam of rectangular cross-section or a sequence of laser beams of circular cross-section, laser beam guiding optics of rectangular cross-section, laser beam focussing optics of rectangular cross-section, said laser output aperture, beam guiding and focussing optics being enclosed within a safety enclosure which can be partially evacuated to prevent laser beam ionization of the atmosphere, the object to be cut being placed within said enclosure via an array of rollers and hydraulic arms which allow for the alignment of said object to be cut relative to the path of said focussed laser beam using an electro-optic alignment system which allows the laser beam to cut the object in a predetermined pattern stored in a computer which also provides the control of the said system as a whole.

2. A system as claimed in claim 1 where the laser beam generator emits a low power pulse over the whole output aperture of rectangular cross-section, said low powered laser pulse being directed via the laser beam guiding optics through the focussing lens to the surface of the object to be cut where it interacts to produce a dense line plasma into which the main laser pulse can be directed causing it to self-focus within said plasma and enter said object as a self-focussed channel causing it to be cut.

3. A system as claimed in claim 1 where the laser beam generator emits a series of laser beams of circular cross-section across the said output aperture of rectangular cross-section such that when said circular cross-section laser beams are focussed onto said object to be cut they form a series of circular self-focussed channels which allow said object to be cut in a plane connecting said channels.

4. A system as claimed in claim 1 where the laser beam generator emits a sequence of laser beams of decreasing diameters across the output aperture of rectangular cross-section so that the focussing optics can focus said beams at different and increasing focal lengths to accommodate tapered objects to be cut.

5. A system as claimed in claim 1 where the tapered object to be cut is tilted relative to said focussed output beam so as to accommodate the cutting process.

6. A system as claimed in claim 1 where the laser beam generator is a phased array laser.

7. A system as claimed in claim 1 where the laser beam generator is a free-electron laser.

8. A system is claimed in claim 1 where a log of wood 1–5 meters in diameter and 30 meters long is cut.

* * * * *